United States Patent
Eckardt

(10) Patent No.: US 8,268,210 B2
(45) Date of Patent: Sep. 18, 2012

(54) METHOD AND APPARATUS FOR THE INJECTION MOLDING OF A MOLDED PART

(75) Inventor: Helmut Eckardt, Meinerzhagen (DE)

(73) Assignee: Wittmann Battenfeld GmbH, Kottingbrunn (AT)

( * ) Notice: Subject to any disclaimer, the term of this patent is extended or adjusted under 35 U.S.C. 154(b) by 0 days.

(21) Appl. No.: 13/087,713

(22) Filed: Apr. 15, 2011

(65) Prior Publication Data

US 2011/0254184 A1    Oct. 20, 2011

(30) Foreign Application Priority Data

Apr. 17, 2010 (DE) .......................... 10 2010 015 452

(51) Int. Cl.
*B29C 45/00* (2006.01)
(52) U.S. Cl. ........................ 264/40.3; 264/572; 425/130
(58) Field of Classification Search .................. 264/40.3, 264/512, 572, 328.14, 319; 425/130, 110, 425/577, 579, 585
See application file for complete search history.

(56) References Cited

U.S. PATENT DOCUMENTS

| | | | | |
|---|---|---|---|---|
| 5,948,343 A | * | 9/1999 | Hiroki et al. ................. | 264/503 |
| 2011/0210482 A1 | * | 9/2011 | Sakamoto et al. ............ | 264/531 |
| 2011/0285057 A1 | * | 11/2011 | Ojiro et al. ................. | 264/328.1 |
| 2012/0068388 A1 | * | 3/2012 | Sakamoto et al. ........... | 264/573 |

FOREIGN PATENT DOCUMENTS

| | | |
|---|---|---|
| DE | 10 2008 023 473 A1 | 11/2009 |
| EP | 0 757 936 B1 | 9/2001 |
| EP | 2 226 176 A1 | 9/2010 |
| JP | 08-229993 * | 9/1996 |
| JP | 11-114997 * | 4/1999 |

OTHER PUBLICATIONS

"Moeglichkeiten and Grenzen der Projetilinjektionstechnik" IKV Fachtagung Gas- Und Wasserinjektionstechnik Potenziale Nutzen, Herausforderungen Meistern, Nov. 28, 2007, p. 1-7 XP007905530.

* cited by examiner

*Primary Examiner* — Jill Heitbrink
(74) *Attorney, Agent, or Firm* — Lucas & Mercanti, LLP

(57) ABSTRACT

The moulded part has at least two different sections with different outer diameter and a void inside the moulded part. To make the void, a projectile is passed through the still molten injection mouldable material in a direction of flow. A pressurized fluid is exerted in the void in the direction of flow behind the projectile to move the projectile. To obtain constant wall thicknesses, the projectile has at least one elastic or plastic section, which is delimited by a space in which the pressurized fluid can enter. The volume of the space and the effective outer diameter of the projectile can be changed by the fluid pressure and is controlled in such a manner that the space and the effective outer diameter of the projectile is enlarged and/or reduced to make the moulded part with different diameters.

11 Claims, 5 Drawing Sheets

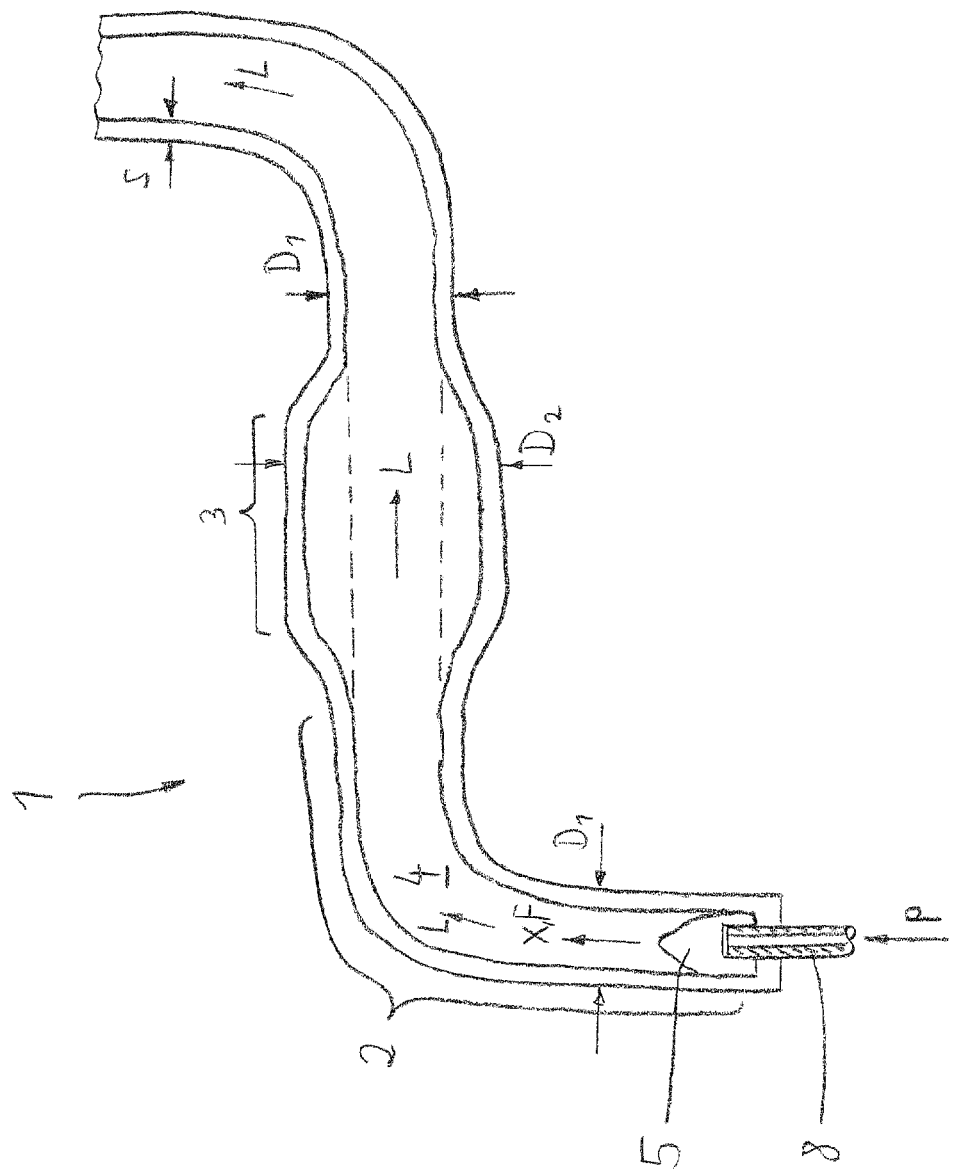

Figure 3:
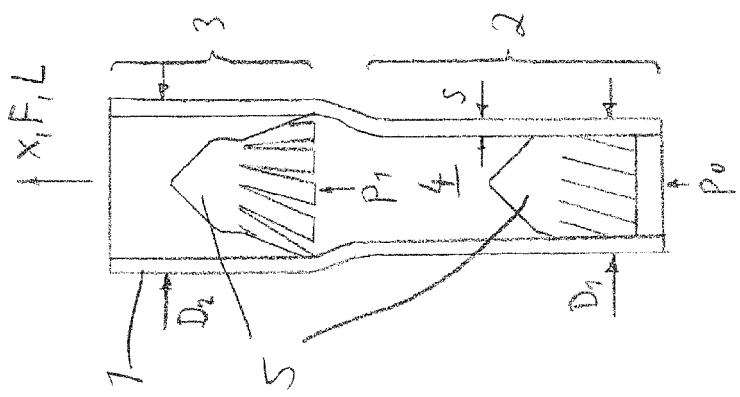

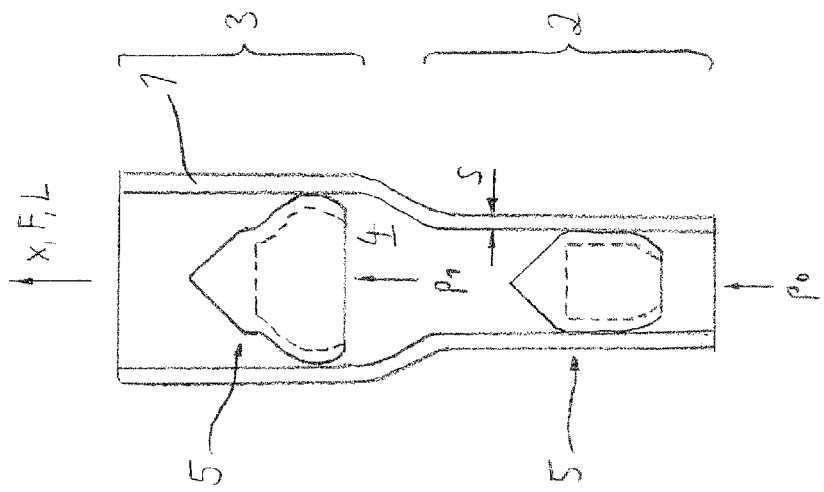
Fig. 5
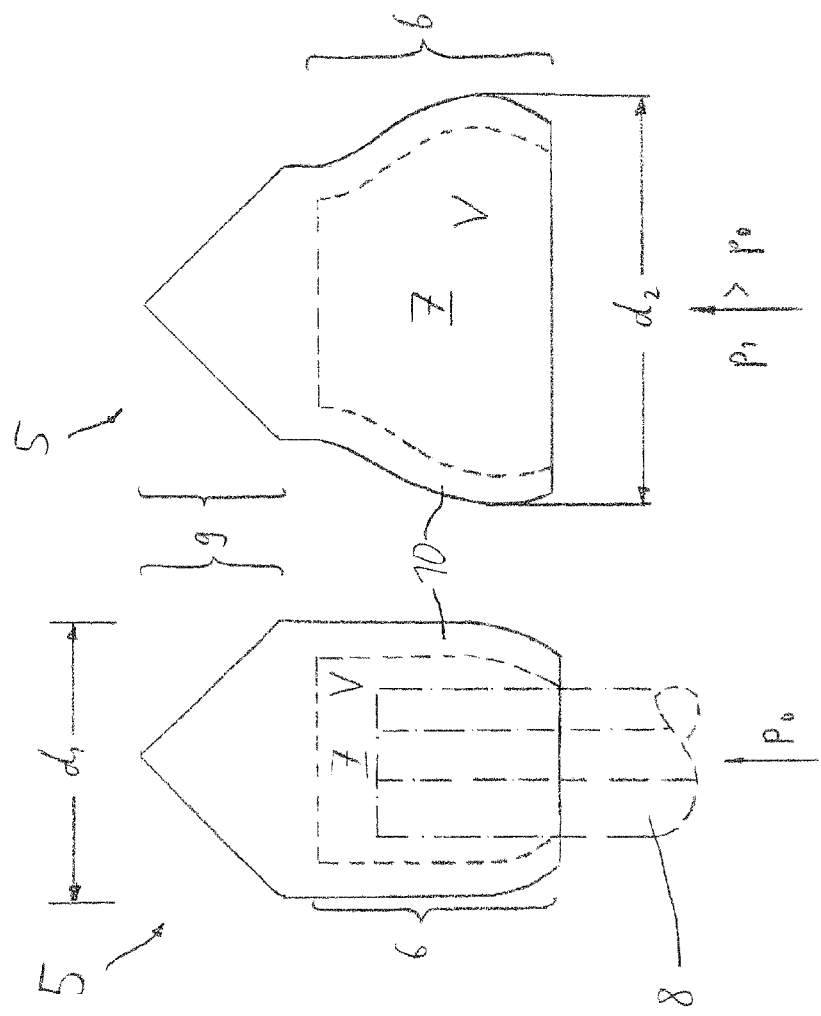
Fig. 4a
Fig. 4b

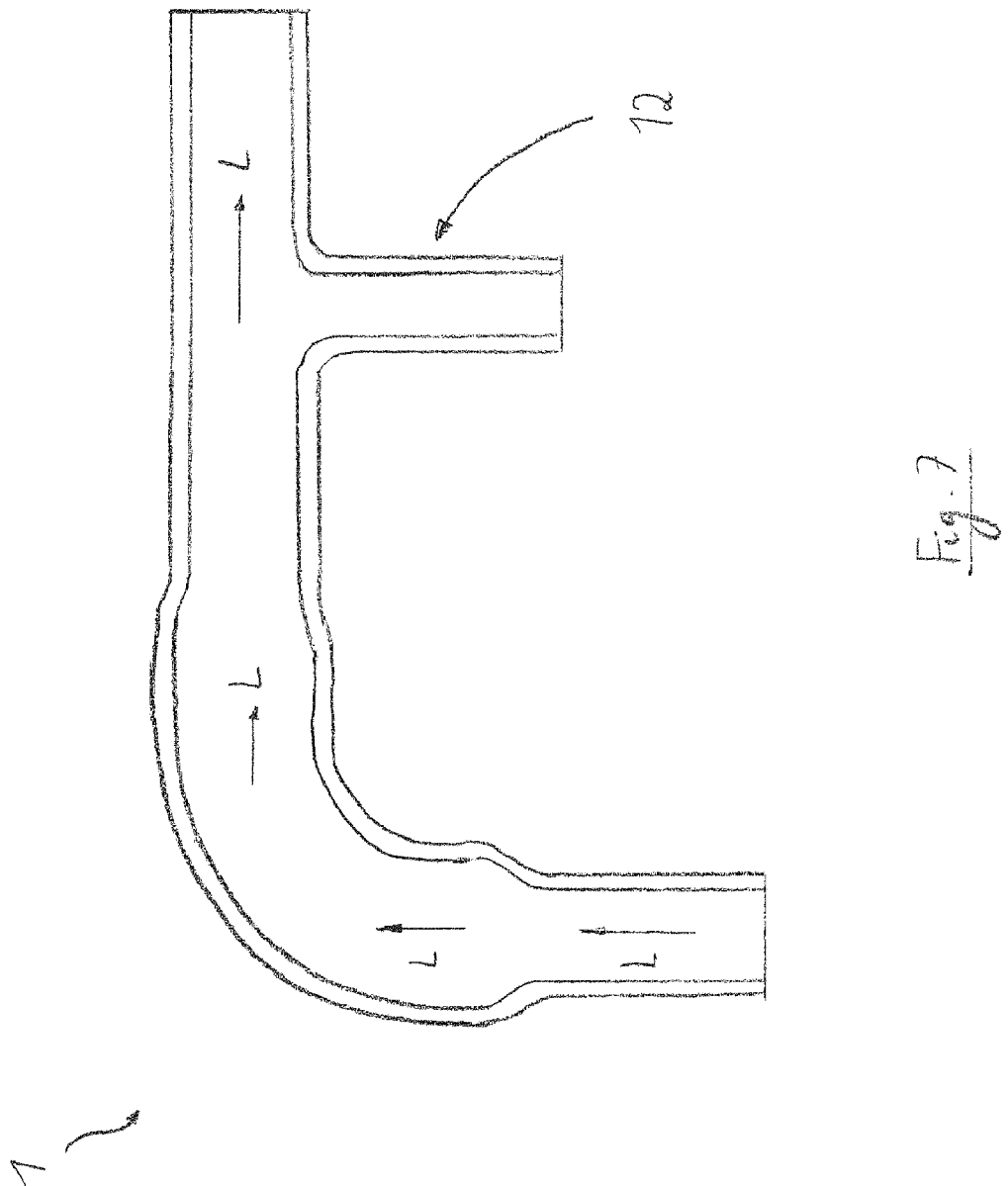

METHOD AND APPARATUS FOR THE INJECTION MOLDING OF A MOLDED PART

This application claims the priority of German Application No. 10 2010 015 452.0 filed Apr. 17, 2010. This application is incorporated by reference herein.

The invention relates to a method for injection moulding of a moulded part, which has at least two different sections being different in the outer diameter, wherein a void is produced in the inner of the moulded part by causing a projectile in the direction of a longitudinal axis of the moulded part through the still molten injection mouldable material in a direction of flow, whereto a pressurized fluid is exerted in the void in the direction of flow behind the projectile which moves the projectile into the direction of flow. Furthermore, the invention relates to an apparatus for injection moulding of a moulded part.

The production of hollow injection moulded parts is well known in the state of the art. Here, the gas assisted injection moulding method or the water assisted injection moulding method can be used beneficially. Another method which has also benefits and which is pre-known is the projectile injection technology of the above mentioned kind. This technology is known for example from EP 0 757 936 B1. Here it is described to inlay a projectile for the injection moulding of a plastic moulded part at a first longitudinal end of an injection moulding cavity in a projectile holder of the injection moulding tool and to cause the projectile through the cavity, which is filled with still pourable plastic, into an auxiliary cavity, which is located at the other second longitudinal end of the cavity by a fluid set under pressure. So, it can be attained to produce a void tube-shaped part in the cavity. For this purpose a conduit for the feeding of fluid under pressure is leading to the projectile holder where the fluid being under pressure can act onto the projectile and move it after a respective flow release. A similar solution is described in DE 10 2008 023 473 A1.

It is beneficial that tube-shaped plastic moulded parts can be produced with the pre-known devices and methods respectively which have a very even wall thickness. In this respect, a better result is obtained compared with the classical gas assisted injection moulding technology. In general, this method can be carried out with any fluid (gas and liquid).

Thus, with the projectile injection technology in connection with the fluid injection technology it is possible to produce for example medium conduits with different sizes and diameters with constant outer diameter and with even and small wall thicknesses and good surface. The method can be employed successfully for medium conduits by using e. g. gas or water as fluid. Thereby, preferably projectiles made of plastic material are used which can consist of the same or another plastic as the medium conduit. Usually, the projectile remains in a section of the medium conduit which is cut off later.

However, restrictions must be made if the outer dimensions of the moulded part, in which inner a void has to be created, are variable. Indeed, the void in the inner remains constant because the moved projectile leaves a void with constant diameter. Accordingly, the wall thickness of the moulded part is changing correspondingly if the outer dimensions are changing which is detrimental with respect to different aspects. At the one hand more plastic than necessary is used for the moulded part compared with the case when the wall thickness remains constant. The different wall thicknesses, i. e. the accumulation of material, cause also a different behaviour of cooling in the regions of the moulded part after the injection process.

More and more medium conduits are required which have different outer diameters along its length. Accordingly, with the pre-known methods a bigger wall thickness results in those regions which have a bigger outer diameter due to the constant inner diameter of the projectile. This leads to the mentioned restrictions when using the method of the generic kind.

Thus, it is an object of the invention to further develop a method and an apparatus of the kind mentioned above so that the mentioned drawbacks and restrictions can be avoided when using the projectile injection technology. Thus, is should become possible to produce also moulded parts with changing outer diameter and with a constant wall thickness.

The solution of this object is characterized by the method according to the invention in that a projectile is used which comprises at least one elastic or plastic section, which section is delimited by a space in which the pressurized fluid can enter when causing the projectile to move, wherein the volume of the space and for this reason the effective outer diameter of the projectile can be changed in dependency of the fluid pressure, wherein the pressure of the pressurized fluid and/or the pressure in the melt or a process factor being dependent from the pressures is controlled or feed-back controlled in such a manner that the space and for this reason the effective outer diameter of the projectile is enlarged and/or reduced in such a way that the effective outer diameter of the projectile has a predetermined value at least in sections along the feeding path in the direction of flow.

The pressure of the pressurized fluid or a process factor being dependent from the pressure is preferably controlled or feed-back controlled in such a manner that the wall thickness of the moulded part has a predetermined value along the longitudinal axis of the moulded part. It can be preferably provided that the pressure of the pressurized fluid or a process factor being dependent from the pressure is controlled or feed-back controlled in such a manner that the wall thickness of the moulded part is constant along the longitudinal axis of the moulded part.

Because the change of the form of the projectile and thereby the change of the effective outer diameter of the same are aimed according to the invention, it is clear that it has to be understood by change of the pressure of the pressurized fluid and of the melt or of a process factor being dependent from the pressure especially that the pressure ratio between the fluid pressure and the melt pressure during the injection moulding is a significant influence parameter. Accordingly, the size and namely the outer diameter of the projectile can be influenced effectively especially by pretending the pressure of the pressurized fluid and the melt injection pressure during the filling phase of the injection moulding process.

Thus, it can be beneficial to influence the pressure onto the melt by respective auxiliary means and measures according to the contour of the moulded part. Thereby, it is suggested to apply e. g. a counter pressure onto the melt during the injection process so that the desired outer diameter of the projectile is adjusted.

The proposed apparatus for injection moulding of a moulded part, which has at least two different sections being different in the outer diameter, wherein a void is arranged in the inner of the moulded part, has an at least two-part injection moulding tool and an injection nozzle for injecting pressurized fluid into the cavity of the injection moulding tool, wherein the apparatus comprises at least one projectile which can be moved by exerting the pressurized fluid through the melt being located in the cavity of the injection moulding tool. The apparatus according to the invention is characterized in that the projectile comprises a head region being arranged in the front seen in the direction of flow and a space which volume is changeable and being arranged in the rear seen in the direction of flow, wherein the space is in fluidic connection with the void.

Accordingly, changes in the pressure of the pressurized fluid cause the volume to be increased or decreased.

According to a possible embodiment of the invention the space is delimited by a thin walled, bladder-like expandable body.

But is can also be provided that the space is delimited at least partially by a plurality of lamella-shaped strips. The lamella-shaped strips can be arranged to the direction of flow under an angle.

Furthermore, a solution has proven in which the space is delimited by a thin walled, bladder-like expandable body, wherein a plurality of lamella-shaped strips are arranged at the outer side of the body.

The lamella-shaped strips can be produced by a mechanical production process, especially by a cutting process.

The projectile is preferably an injection moulded part, wherein it consists especially of thermoplastic elastomere (TPE), of polypropylene (PP), of polyethylene (PE) or of polyamide (PA).

The base idea of the proposed concept thus provides that a projectile is used which can experience a change of its outer diameter at least in a region of its outer circumference and outer diameter respectively. This is reached by a specific geometrical design of the projectile. Therefore, the material for the projectile is chosen respectively. The change of the outer diameter of the projectile can take place by the control or feed-back control of the pressure and a process factor respectively which is in connection with the pressure (e. g. volume of the fluid, filling time, filling speed, melt temperature).

The proposed method and the corresponding apparatus thus allow to produce moulded parts by injection moulding which have a substantial constant wall thickness in spite of a variable outer diameter. According to the invention the outer diameter of the projectile can be adapted to the outer diameter of the moulded part, e. g. of the medium conduit, for which reason the wall thickness of the moulded part can be kept constant along the entire longitudinal axis.

A projectile is used which can change its outer diameter in dependence of the pressure. This is possible due to the fact that the projectile can rise or also decline again in its outer diameter by reason of its geometrical design.

The required projectiles can be produced in simple and cost efficient manner (e. g. by injection moulding).

The desired and aimed change in the outer diameter of the projectile can occur as an elastic or also plastic deformation of the outer contour by a specific controlled or feed-back controlled pressure of the pressurized fluid and of the melt respectively. If a plastic material is used which is deformable under pressure, like e. g. thermoplastic elastomere (TPE), the boundary surface of the projectile bulges under pressure to the outer side and follows the contour of the cavity.

The deformation of the projectile for the adjustment of the wall thickness of the moulded part can be controlled or feed-back controlled by the pressure, the temperature and the time in such a manner that the desired profile of the wall thickness along the length of the moulded part is reached.

The fixation of the projectile onto the injection nozzle takes place in known manner. The projectile is placed on the nozzle (injector) and closes the fluid injection aperture. Thereby, fluid injectors can be used which can be produced easily and cost efficiently.

To avoid an early partial melting of the projectile by the melt during the pre-filling e. g. a cooling of the projectile from the inner via the fluid injection nozzle (fluid injector) can take place. For example, after the placement of the projectile till the end of the pre-filling with melt at least a temporarily cooling can take place by the fluid injector. Possible solutions in respect to this are known from EP 1 366 882 B1 so that reference is made insofar explicitly.

During the movement of the projectile through the void the cooling can take place by the pressurized fluid.

To avoid an early partial melting of the projectile by the melt it is also possible to cool down the projectile to a very low temperature before its placing on the fluid injector.

In addition to the inner centering on the injection nozzle an outer centering of the projectile in the injection moulding tool can take place, e. g. to compress the projectile at first.

Furthermore, it is possible to start at first with big outer diameters of the moulded parts which follow smaller diameters.

A small and easy and cost efficient injection nozzle without closure is used.

The cooling times are relatively short because the plastic solidifies immediately (especially when water is used as fluid).

In general, the proposed method can be operated with all methods known for the fluid injection technology, like e. g. partial filling of the cavity with melt, using of a spill over cavity and hack pressing of melt (e. g. into the space in front of the screw). Also, the "full shot" technique can be employed (complete filling of the cavity), wherein excessive plastic melt is expelled into an auxiliary cavity on into the space in front of the screw.

In the drawing embodiments of the invention are shown.

Figure 2B:
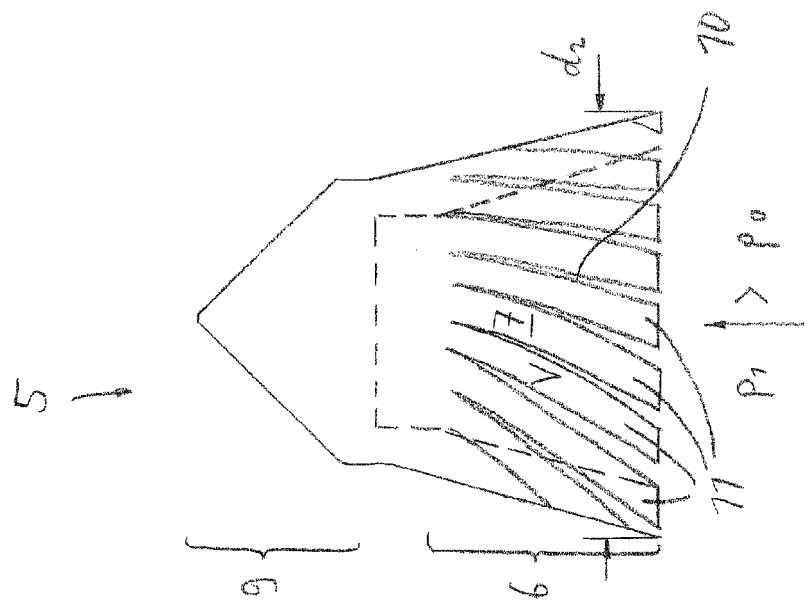
Figure 2A:
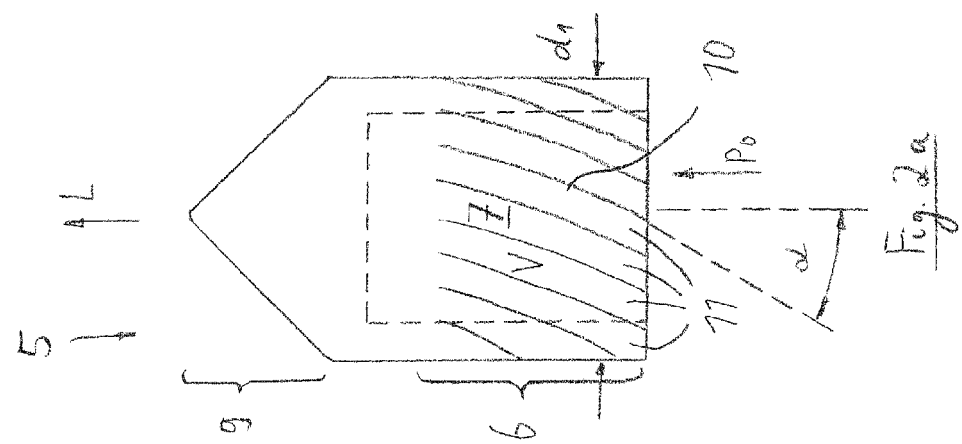
Figures 6A, 6B:
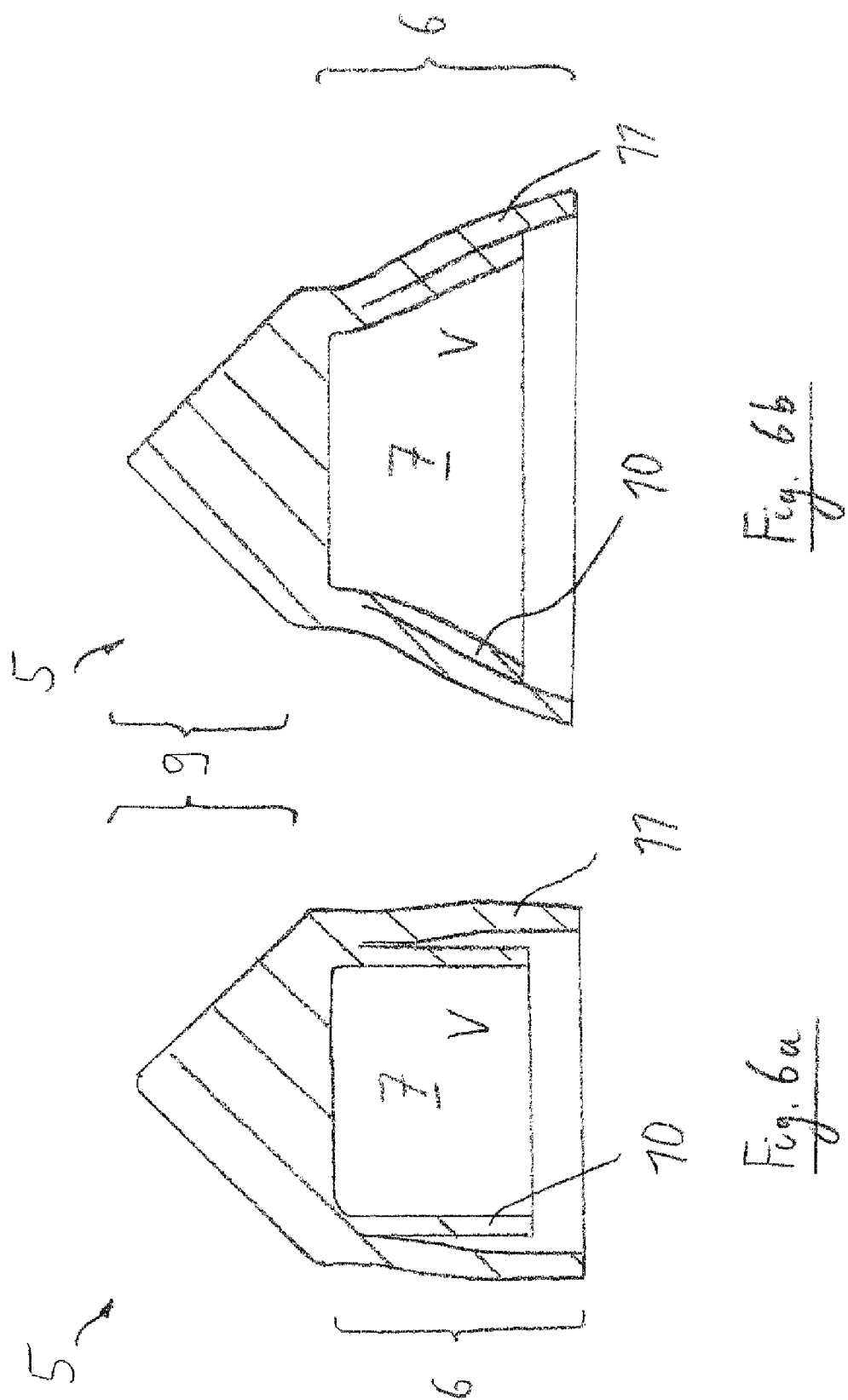

FIG. 1 shows a sectional side view of an injection moulded part being a medium conduit, which extends along a longitudinal axis, FIG. 2a shows a projectile according to a first embodiment of the invention in a side view, wherein the projectile is in an initial state, FIG. 2b shows the projectile according to FIG. 2a, wherein the projectile is now in an expanded state, FIG. 3 shows a section of a moulded part in which a projectile is depicted in two different process steps during the injection moulding, FIG. 4a shows a projectile according to a second embodiment of the invention in a side view, wherein the projectile is in an initial state, FIG. 4b shows the projectile according to FIG. 4a, wherein the projectile is now in an expanded state, FIG. 5 shows a section of a moulded part in which the projectile is depicted in two different process steps during the injection moulding, FIG. 6a shows a projectile according to a third embodiment of the invention in a side view, wherein the projectile is in an initial state, FIG. 6b shows the projectile according to FIG. 6a, wherein the projectile is now in an expanded state, and FIG. 7 shows a sectional side view of an injection moulded part being a medium conduit, which extends along a longitudinal axis and having a side branch which has been produced by the gas assisted injection moulding method.

In FIG. 1 a moulded part 1 is shown which extends along a longitudinal axis L. Thereby, the moulded part has different sections with different outer diameters. A section 2 is designated with a first outer diameter $D_1$. In the direction of the longitudinal axis L a section 3 follows with an outer diameter $D_2$ which is bigger than the outer diameter $D_1$. In the further course a section follows again with the outer diameter $D_1$. The moulded part 1 has a void 4. This void 4 is produced by the projectile injection method. This is shown in FIG. 1 by the fact that the projectile 5 is depicted in its initial position which is used. It is placed onto an injection nozzle 8 by which fluid (e. g. water or nitrogen) can be injected under a pressure p. After a respective amount of melt is injected into the cavity of the injection moulding tool the projectile is shot and is caused in the direction of flow F through the cavity by entering of a pressurized fluid via the injection nozzle 5. The feeding path is designated with x. It is important, that it is aimed that in spite of the changing outer diameter of the moulded part 1 along the longitudinal axis a constant wall thickness s as possible is maintained.

This is obtained in the embodiment with a projectile 5 as shown in FIG. 2a and FIG. 2b for two different process states. The use of the projectile 5 is shown for two subsequent process states in FIG. 3.

Accordingly, the projectile 5 has a quasi undeformable head region 9 in the front region seen in the direction of flow F. However, in the rear region, seen in the direction of flow F, an elastic section 6 is provided which is realized by an expandable body 10. This elastic section 6 is formed in the embodiment according FIG. 2 by a plurality of lamella-shaped strips 11, which are arranged—seen in the direction of the longitudinal axis L—under an angle α. This angle is in the shown embodiment approximately 20°.

In the initial state according to FIG. 2a the projectile 5 has an outer diameter $d_1$. The space 7 which is enclosed by the expandable body 10 has a volume V.

The projectile 5 is designed in such a manner that it changes its outer shape if the fluid pressure, which is exerted via the injection nozzle 8 in the void 4, is increased as can be seen from FIG. 2b. The pressure $p_1$ which is now acting is higher than the initial pressure $p_0$ in the case of FIG. 2a. As a result the space 7 is enlarged in its volume V; it is "blown up" by the higher pressure. As can be seen the outer diameter of the projectile 5 is increased to the value $d_2$.

This means applied to the employed process that firstly a first section 2 of the moulded part 1 can be produced with a first, lower pressure $p_0$ as can be seen in the bottom part of FIG. 3. The moulded part 1 has here the outer diameter $D_1$ and a respective wall thickness s. If the outer diameter of the moulded part increases to the value $D_2$ which is the case in the section 3 of the moulded part 1 (see upper part of FIG. 3) the fluid pressure is increased via the injection nozzle 8 to a higher value $p_1$ (and/or the melt pressure is reduced respectively) so that the outer diameter of the projectile is increased. This takes place in a controlled or feed-back controlled manner so that the wall thickness s is kept constant.

If the outer diameter of the moulded part changes again along the feeding path x of the projectile 5 the outer diameter of the projectile is again adjusted by a change of the pressure and viscosity relations.

An analogue situation can be seen in the embodiment according to FIG. 4a and FIG. 4b; the use of this projectile 5 is shown in FIG. 5. Here, the elastic section 6 of the projectile 5, i. e. the expandable body 10, is formed as a hollow cylindrical section with a bit reduced bended section at the axial end which has a sufficient small wall thickness to expand due to a change of the pressure (from a lower value $p_0$ to a higher value $p_1$) in the depicted manner. Accordingly, the outer diameter $d_1$ of the projectile 5 grows to the higher value $d_2$.

In FIG. 4a the projectile 5 is shown in that state in which it is placed onto the injection nozzle 8 (shown with dashed lines).

Finally, in FIG. 6a and FIG. 6b a further embodiment of the projectile 5 is shown. Here, the expandable body 10 is designed as a hollow cylindrical part with small wall thickness. Above the body 10 lamella-shaped strips 11 are arranged. Accordingly, the solutions according FIG. 2 and FIG. 4 are combined here. The projectile is heated by the plastic melt not so intensive here due to the bigger wall thickness of the same. Nevertheless an easy possibility of production is given.

The wall thickness of the inner body 10 is adjusted in such a way that the same can be deformed in a desired manner when exposed to pressure, i. e. it can be inflated and can press the lamella-shaped strips 11 to the radial outer side. If the pressure of the fluid decreases again the body 10 is formed back into the initial shape and the lamella-like strips 11 can lay back again to the inner side.

It is also possible that the wall thicknesses of the bodies 10 are partially modified in such a manner that the change of the diameter does not occur symmetrically around the circumference. This principle applies to all described embodiments of the projectile 5.

The lamellas, which are running slanted (see angle α in FIG. 2a), ensure also in the expanded state in axial direction that the lamellas are meshing in such a way that the inner surface of the moulded part is cleared circular-shaped. The expansion occurs due to the medium pressure p during the fluid injection in relation to the counter pressure of the plastic melt. In the case of a diminution of the diameter the lamellas are pressed again together so that the wall thickness of the tube-shaped moulded part remains constant.

The production of the proposed projectile 5 with lamellas can done e. g. by injection moulding with splayed lamellas for sake of an easy production and demoulding. The slanted lamellas can also be produced after the injection moulding by a mechanical process.

The projectile 5 can be made of plastic but also of another material. However, the projectile is made preferably of plastic, wherein as a suitable plastic material thermoplastic elastomere (TPE) with different hardness is chosen. Other suitable plastic types are e. g. PP and PE, but also PA and suitable blends.

The plastic of which the projectile 5 is made must match with the plastic of the moulded part in such a way that a partial melting during the pre-filling with melt does not occur. This can be done e. g. by suitable measures like cooling of the projectile during the pre-filling with melt or cooling down of the projectile to very deep temperatures before the placement onto the fluid injection nozzle.

In FIG. 7 another moulded part is shown which was produced with the proposed method. It has to be noted here that a hollow branch duct 12 exists which can be produced mechanically or by fluid injection.

LIST OF REFERENCE NUMERALS

1 moulded part
2 section of the moulded part
3 section of the moulded part
4 void
5 projectile
6 elastic/plastic section
7 space
8 injection nozzle for pressurized fluid
9 head region
10 expandable body
11 lamella-shaped strip
12 branch duct $D_1$ outer diameter of the moulded part
$D_2$ outer diameter of the moulded part
$d_1$ outer diameter of the projectile
$d_2$ outer diameter of the projectile
x feeding path
s wall thickness
p fluid pressure
V volume
L longitudinal axis
F direction of flow
α angle

The invention claimed is:

1. Method for injection moulding of a moulded part (1), which has at least two different sections (2, 3) being different in the outer diameter ($D_1$, $D_2$), wherein a void (4) is produced in the inner of the moulded part (1) by causing a projectile (5) in the direction of a longitudinal axis (L) of the moulded part (1) through the still molten injection mouldable material in a direction of flow (F), whereto a pressurized fluid is exerted in the void (4) in the direction of flow (F) behind the projectile (5) which moves the projectile (5) into the direction of flow (F),
characterized in that
a projectile (5) is used which comprises at least one elastic or plastic section (6), which section (6) is delimited by a space (7) in which the pressurized fluid can enter when causing the projectile (5) to move, wherein the volume (V) of the space (7) and for this reason the effective outer diameter ($d_1$, $d_2$) of the projectile (5) can be changed in dependency of the fluid pressure (p), wherein the pressure (p) of the pressurized fluid and/or the pressure in the melt or a process factor being dependent from the pressures is controlled or feed-back controlled in such a manner that the space (7) and for this reason the effective outer diameter ($d_1$, $d_2$) of the projectile (5) is enlarged and/or reduced in such a way that the effective outer diameter ($d_1$, $d_2$) of the projectile (5) has a predetermined value at least in sections along the feeding path (x) in the direction of flow (F).

2. Method according to claim 1, characterized in that the pressure (p) of the pressurized fluid or a process factor being dependent from the pressure (p) is controlled or feed-back controlled in such a manner that the wall thickness (s) of the moulded part (1) has a predetermined value along the longitudinal axis (L) of the moulded part (1).

3. Method according to claim 2, characterized in that the pressure (p) of the pressurized fluid or a process factor being dependent from the pressure (p) is controlled or feed-back controlled in such a manner that the wall thickness (s) of the moulded part (1) is constant along the longitudinal axis (L) of the moulded part (1).

4. Apparatus for injection moulding of a moulded part (1), which moulded part (1) has at least two different sections (2, 3) being different in the outer diameter ($D_1$, $D_2$), wherein a void (4) is arranged in the inner of the moulded part (1), which apparatus has an at least two-part injection moulding tool and an injection nozzle (8) for injecting pressurized fluid into the cavity of the injection moulding tool, wherein the apparatus comprises at least one projectile (5) which can be moved by exerting the pressurized fluid through the melt being located in the cavity of the injection moulding tool, wherein the apparatus is used for carrying out the method according to claim 1,
characterized in that
the projectile (5) comprises a head region (9) being arranged in the front seen in the direction of flow (F) and a space (7) which volume is changeable and being arranged in the rear seen in the direction of flow (F), wherein the space (7) is in fluidic connection with the void (4).

5. Apparatus according to claim 4, characterized in that the space (7) delimited by a thin walled, bladder-like expandable body (10).

6. Apparatus according to claim 4, characterized in that the space (7) is delimited at least partially by a plurality of lamella-shaped strips (11).

7. Apparatus according to claim 6, characterized in that the lamella-shaped strips (11) are arranged to the direction of flow (F) under an angle (α).

8. Apparatus according to claim 4, characterized in that the space (7) is delimited by a thin walled, bladder-like expandable body (10), wherein a plurality of lamella-shaped strips (11) are arranged at the outer side of the body (10).

9. Apparatus according to claim 6, characterized in that the lamella-shaped strips (11) are produced by a mechanical production process, especially by a cutting process.

10. Apparatus according to claim 4, characterized in that the projectile (5) is an injection moulded part, wherein it consists especially of thermoplastic elastomere (TPE), of polypropylene (PP), of polyethylene (PE) or of polyamide (PA).

11. Apparatus according to claim 8, characterized in that the lamella-shaped strips (11) are produced by a mechanical production process, especially by a cutting process.

* * * * *